(12) United States Patent
Ogata

(10) Patent No.: US 7,617,896 B2
(45) Date of Patent: Nov. 17, 2009

(54) CONTROL DEVICE FOR AN ELECTRIC VEHICLE

(75) Inventor: Makoto Ogata, Kanagawa (JP)

(73) Assignee: Mitsubishi Fuso Truck and Bus Corporation, Kanagawa (JP)

( * ) Notice: Subject to any disclaimer, the term of this patent is extended or adjusted under 35 U.S.C. 154(b) by 373 days.

(21) Appl. No.: 11/723,853

(22) Filed: Mar. 22, 2007

(65) Prior Publication Data
US 2007/0225113 A1 Sep. 27, 2007

(30) Foreign Application Priority Data
Mar. 23, 2006 (JP) .............................. 2006-080741

(51) Int. Cl.
B60K 1/00 (2006.01)
H02P 8/00 (2006.01)
(52) U.S. Cl. .................... 180/65.7; 180/292; 180/293; 180/294; 180/65.6; 180/65.1; 180/65.21; 180/65.275; 180/65.285; 318/430; 318/432; 701/22; 701/70; 477/3; 477/5; 477/19; 477/99
(58) Field of Classification Search ................ 180/292, 180/293, 294, 65.1, 65.21, 65.275, 65.285, 180/65.6, 65.7; 477/3, 5, 19, 99; 318/430, 318/432; 701/22, 70
See application file for complete search history.

(56) References Cited

U.S. PATENT DOCUMENTS

| | | | |
|---|---|---|---|
| 5,638,271 A | | 6/1997 | White et al. |
| 5,735,770 A | * | 4/1998 | Omote et al. .................... 477/5 |
| 5,884,201 A | * | 3/1999 | Kawai .......................... 701/22 |
| 5,942,879 A | * | 8/1999 | Ibaraki ......................... 322/16 |
| 6,123,642 A | * | 9/2000 | Saito et al. ...................... 477/3 |
| 6,275,759 B1 | * | 8/2001 | Nakajima et al. ............. 701/54 |
| 6,315,068 B1 | * | 11/2001 | Hoshiya et al. ........... 180/65.25 |
| 6,340,847 B1 | * | 1/2002 | Kawabata et al. ......... 290/40 C |
| 6,429,613 B2 | * | 8/2002 | Yanase et al. ................ 318/139 |
| 6,430,483 B2 | * | 8/2002 | Takaoka et al. ................ 701/22 |
| 6,459,166 B2 | * | 10/2002 | Yanase et al. ............. 290/40 C |
| 6,524,215 B1 | * | 2/2003 | Schmidt ......................... 477/3 |
| 6,532,926 B1 | * | 3/2003 | Kuroda et al. ............. 123/179.4 |
| 6,554,736 B2 | * | 4/2003 | Takano et al. ................... 477/5 |
| 6,739,418 B2 | * | 5/2004 | Ogata et al. ............. 180/65.245 |

(Continued)

FOREIGN PATENT DOCUMENTS

DE 195 30 233 2/1997

*Primary Examiner*—Christopher P Ellis
*Assistant Examiner*—Jacob Meyer
(74) *Attorney, Agent, or Firm*—Jacobson Holman PLLC

(57) ABSTRACT

An electric vehicle is provided with an electric motor and a transmission capable of being shifted by a shift mechanism from a neutral state to a start-up speed stage selected state in which a speed stage for start-up of the vehicle has been selected. On a request for a shift from the neutral state to the start-up speed stage selected state, an ECU performs the requested shift by controlling the shift mechanism. If the shift to the start-up speed stage selected state is not completed within a first specified time, the ECU performs a rotating position control in which the motor is controlled to produce a predetermined minute torque in forward and backward rotation directions of the motor, alternately, and a gear of the speed stage for start-up is caused to oscillate in a rotation direction by the minute torque being transmitted to an input shaft of the transmission.

4 Claims, 4 Drawing Sheets

U.S. PATENT DOCUMENTS

| | | | |
|---|---|---|---|
| 6,796,287 B2 * | 9/2004 | Mogi et al. | 123/319 |
| 6,915,782 B2 * | 7/2005 | Hanada et al. | 123/399 |
| 7,079,933 B2 * | 7/2006 | Kano et al. | 701/67 |
| 7,377,877 B2 * | 5/2008 | Ogata | 477/3 |
| 7,477,031 B2 * | 1/2009 | Ogata et al. | 318/430 |
| 7,530,920 B2 * | 5/2009 | Matsubara et al. | 477/3 |
| 2002/0143441 A1 * | 10/2002 | Yamaguchi et al. | 701/22 |
| 2003/0060948 A1 * | 3/2003 | Yamaguchi et al. | 701/22 |
| 2007/0099748 A1 * | 5/2007 | Matsubara et al. | 477/3 |
| 2007/0278022 A1 * | 12/2007 | Tanishima | 180/65.2 |
| 2008/0153661 A1 * | 6/2008 | Shibata et al. | 477/3 |
| 2008/0242463 A1 * | 10/2008 | Yamada et al. | 475/5 |
| 2008/0300744 A1 * | 12/2008 | Katsuta et al. | 701/22 |

* cited by examiner

CONTROL DEVICE FOR AN ELECTRIC VEHICLE

BACKGROUND OF THE INVENTION

1. Field of the Invention

This invention relates to a control device for an electric vehicle, and particularly a control device for an electric vehicle arranged such that a driving force of an electric motor can be transmitted to the driving wheels of the vehicle through a transmission capable of being shifted, by means of a shift mechanism, from neutral state to a state in which a speed stage for start-up of the vehicle has been selected (hereinafter such speed stage is referred to as "vehicle start-up speed stage").

2. Description of the Related Art

An electric vehicle arranged such that a driving force of an electric motor is transmitted to the driving wheels of the vehicle is known. In recent years, in order to improve practical utility, there has been developed and come into practical use a hybrid electric vehicle in which also an engine is mounted in combination with an electric motor such that a driving force of the engine and a driving force of the electric motor can be transmitted to the driving wheels of the vehicle.

In electric vehicles including such hybrid electric vehicles, for smooth start of traveling and improvement of the driving performance of the vehicle, it is arranged such that the driving force of the electric motor is transmitted to the driving wheels through a transmission.

When use of an automatic transmission is intended particularly in vehicles such as trucks, in order to ensure that the automatic transmission withstands high load, there is adopted an automatic transmission of a type such that a speed change gear mechanism similar to that of a manual transmission is combined with an electric or hydraulic actuator. In this type of automatic transmission, a shift to a different speed stage is performed under synchronization by a synchronizing mechanism.

An electric vehicle to which such automatic transmission is applied is disclosed in Unexamined Japanese Patent Publication No. Hei 6-245329 (hereinafter referred to as "Patent Document 1"). In the electric vehicle of Patent Document 1, when the vehicle is to start traveling, a shift from neutral state to a state in which a vehicle start-up speed stage has been selected is accomplished in the manner such that a spline gear provided to a synchronizing sleeve of the synchronizing mechanism corresponding to a speed change gear for the vehicle start-up speed stage is engaged with a clutch gear provided to the speed change gear for the vehicle start-up speed stage.

When the vehicle is to start traveling, however, the vehicle is at rest so that the input rotary shaft of the transmission to which the electric motor is connected and the output rotary shaft of the transmission to which the driving wheels are connected are both at rest. Thus, depending on the position of the rotary shaft of the electric motor at rest, splines of the spline gear may butt against dog teeth of the clutch gear. In such case, since the rotary haft of the transmission is connected with a rotor of the electric motor, the splines cannot push away the dog teeth and fit between them, so that the shift to the vehicle star-up speed stage cannot be accomplished.

In the electric vehicle of Patent Document 1, in order to solve the above problem, it is arranged such that when a shift from the neutral state to the state in which the vehicle start-up speed stage has been selected is not accomplished although the driver performs an operation to select the vehicle start-up speed stage, the electric motor is momentarily driven to release the splines of the spline gear and the dog teeth of the clutch gear from butting.

In the electric vehicle of Patent Document 1, however, since the electric motor is momentarily driven only in the forward rotation direction, the electric motor continues rotation for a while after momentarily driven. While the electric motor continues rotation, the splines of the spline gear rotate relative to the dog teeth of the clutch gear, so that it is still difficult for the splines to fit in the clutch gear.

Further, in the electric vehicle of Patent Document 1, it is arranged such that the electric motor is driven only when the driver engages the clutch again after disengaging it. Thus, when the driver keeps the clutch disengaged or when the electric vehicle is designed to require no clutch operations by the driver, the problem that a shift from the neutral state to the state in which the vehicle start-up speed stage has been selected cannot be accomplished remains unsolved.

SUMMARY OF THE INVENTION

An aspect of the present invention is directed to a control device for an electric vehicle arranged such that a driving force of an electric motor can be transmitted to driving wheels of the vehicle through a transmission capable of being shifted, by means of a shift mechanism, from a neutral state to a start-up speed stage selected state in which a speed stage for start-up of the vehicle has been selected, comprising: a speed stage detection means for detecting speed stage selected in the transmission; and a control means which, on a request for a shift from the neutral state to the start-up speed stage selected state, performs a shift from the neutral state to the start-up speed stage selected state by controlling the shift mechanism, and if it is judged based on a detection result fed by the speed stage detection means that the shift to the start-up speed stage selected state is not completed within a first specified time, the control means performs a rotating position control in which the electric motor is controlled to produce a predetermined minute torque in forward and backward rotation directions of the electric motor, alternately, and a speed change gear of the speed stage for start-up of the vehicle is caused to oscillate in a rotation direction by the minute torque being transmitted to an input shaft of the transmission.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Referring to the attached drawings, an embodiment of the present invention will be described below.

Figure 1:
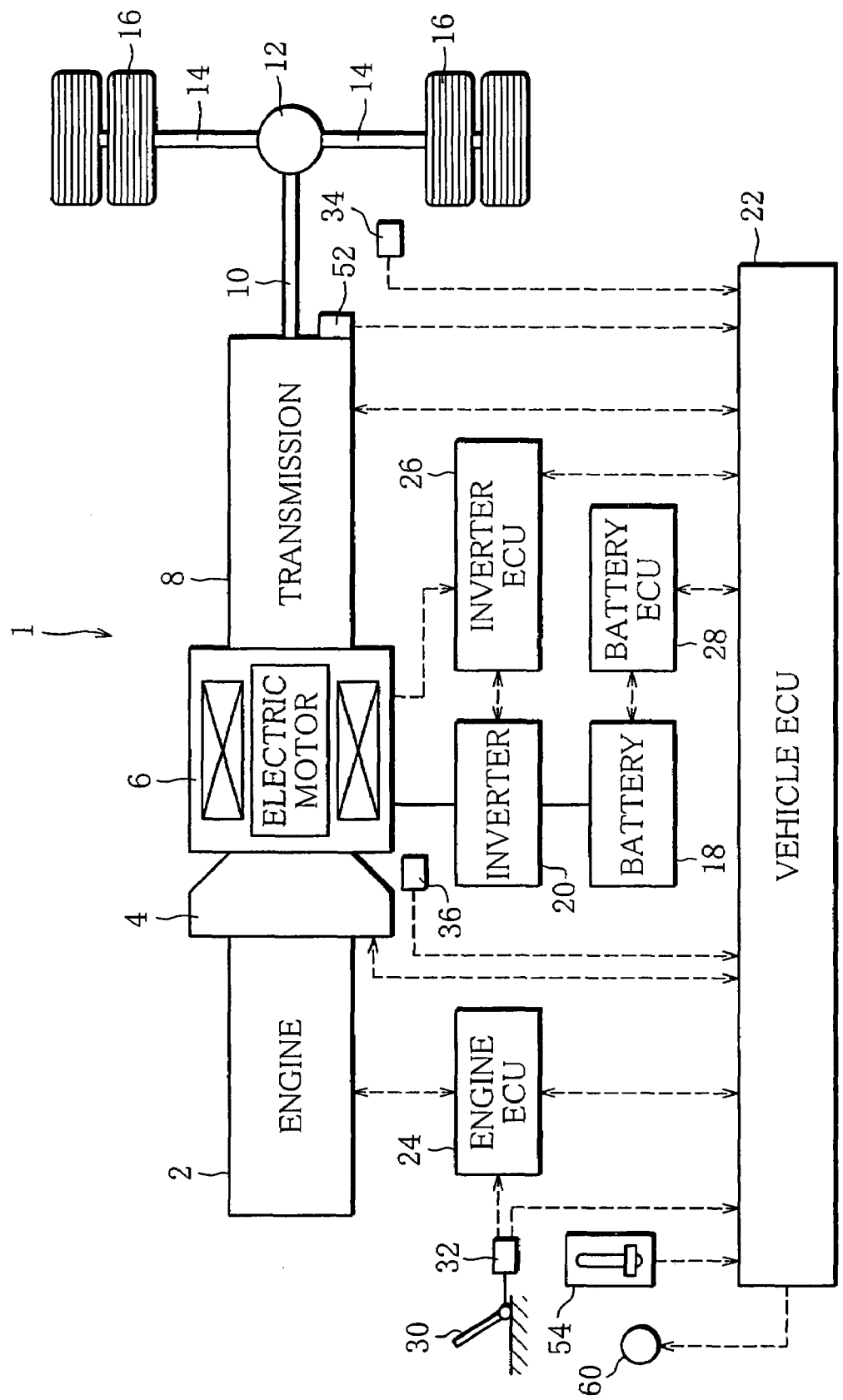
FIG. 1 is a diagram showing the schematic structure of a hybrid electric vehicle to which an embodiment of the present invention is applied.

FIG. 1 is a diagram showing the schematic structure of a hybrid electric vehicle 1 to which the present invention is applied.

An input shaft of a clutch 4 is coupled with an output shaft of an engine 2, which is a diesel engine. An output shaft of the clutch 4 is coupled to an input shaft of an automatic transmission (hereinafter referred to as "transmission") 8 through a rotary shaft of a permanent-magnetic synchronous motor (hereinafter referred to as "electric motor") 6. An output shaft 8 of the transmission 8 is connected to right and left driving wheels 16 through a propeller shaft 10, a differential gear unit 12 and driving shafts 14.

Thus, when the clutch 4 is engaged, the output shaft of the engine 2 and the rotary shaft of the electric motor 6 are coupled together and can be mechanically connected with the driving wheels 16 through the transmission 8. Meanwhile, when the clutch 4 is disengaged, the output shaft of the engine 2 is disconnected from the rotary shaft of the electric motor 6, and thus only the rotary shaft of the electric motor 6 can be mechanically connected with the driving wheels 16 through the transmission 8.

The electric motor 6 is operated as a motor when DC power stored in a battery 18 is supplied to the electric motor 6 after being converted into AC power by an inverter 20. A driving torque of the electric motor is transmitted to the driving wheels 16 after being transformed to a suitable speed by the transmission 8. In deceleration of the vehicle, the electric motor 6 is operated as a generator. Kinetic energy created by the rotation of the driving wheels 16 is transmitted to the electric motor 6 through the transmission 8 to be converted into AC power, thereby producing a regenerative braking torque. This AC power is then converted into DC power by the inverter 20 and charged to the battery 18. In this manner, the kinetic energy created by the rotation of the driving wheels 16 is recovered as electrical energy.

Meanwhile, a driving torque of the engine 2 is transmitted to the transmission 8 through the rotary shaft of the electric motor 6 while the clutch 4 is engaged. After being transformed to a suitable speed, the driving torque of the engine 2 is transmitted to the driving wheels 16. Thus, if the electric motor 6 is operated as a motor while the driving torque of the engine 2 is transmitted to the driving wheels 16, both the driving torque of the engine 2 and the driving torque of the electric motor 6 are transmitted to the driving wheels 16 through the transmission 8. In other words, a part of the driving torque to be transmitted to the driving wheels 16 to drive the vehicle is supplied by the engine 2, and at the same time, the rest of the driving torque is supplied by the electric motor 6.

If a storage rate (hereinafter referred to as "SOC") of the battery 18 lowers so that the battery 18 requires to be charged, the electric motor 6 is operated as a generator. Moreover, the electric motor is driven by using a part of the driving force of the engine 2, to thereby carry out power generation. As described above, the generated AC power is converted into DC power by the inverter 20, and the battery 18 is charged with this DC power.

A vehicle ECU 22 (control means) implements a engagement/disengagement control of the clutch 4 and a shift control of the transmission 8, in accordance with the operating state of the vehicle represented by, for example the traveling speed of the vehicle detected by a vehicle speed sensor 34, the operating state of the engine 2, the revolution speed of the electric motor 6 detected by a revolution speed sensor 36, information from an engine ECU 24, an inverter ECU 26 and a battery ECU 28, etc. The vehicle ECU 22 also performs an integrated control for properly controlling the engine 2 and the electric motor 6 according to the state of the above-mentioned controls, and the various kinds of operating conditions of the vehicle, such as start-up, acceleration, and deceleration of the vehicle.

The engine ECU 24 carries out start/stop control of the engine 2 on the basis of information supplied from the vehicle ECU 22. Also, the engine ECU 24 carries out a variety of controls required in the operation of the engine 2 per se, including an idling control of the engine 2, a regeneration control of an exhaust gas purification device (not shown), and the like. Further, the engine ECU 24 controls fuel injection quantity, fuel injection timing, etc. of the engine 2 so that the engine 2 produces a torque required in the engine 2, which has been set by the vehicle ECU 22.

The inverter ECU 26 monitors the state of the electric motor 6 and the state of the inverter 20 such as the temperature of the inverter 20, and feeds information about them to the vehicle ECU 22. Further, the inverter ECU 26 controls the inverter 20 in accordance with the torque to be produced by the electric motor 6, which has been set by the vehicle ECU 22, and thereby controls the operation of the electric motor 6 so that the electric motor 6 is operated as a motor or a generator.

The battery ECU 28 detects the temperature of the battery 18, the voltage of the battery 18, a current flowing between the inverter 20 and the battery 18, etc. The battery ECU 28 obtains the SOC of the battery 18 from these detection results and feeds the obtained SOC to the vehicle ECU 22, together with the detection results.

While exchanging information with the engine ECU 24, the inverter ECU 26 and the battery ECU 28, the vehicle ECU 22 instructs the engine ECU 24 and the inverter ECU 26 to properly control the engine 2 and the electric motor 6, respectively, and also controls the clutch 4 and the transmission 8 appropriately.

When performing these controls, the vehicle ECU 22 calculates a required torque necessary to run the vehicle, on the basis of detection results fed from an accelerator opening sensor 32 for detecting the depression amount of an accelerator pedal 30, a vehicle speed sensor 34 for detecting the traveling speed of the vehicle, and a revolution speed sensor 36 for detecting the revolution speed of the electric motor 6. Further, on the basis of the information supplied from each ECU, the vehicle ECU 22 divides the required torque between the engine 2 and the electric motor 6, depending on the present operating state of the vehicle, and the present operating state of the engine 2 and of the electric motor 6, and feeds an instruction designating the respective divided torques, to the engine ECU 24 and the inverter ECU 26. In this process, the vehicle ECU 22 controls the transmission 8 and the clutch 4 as necessary.

When the required torque is assigned only to the electric motor 6 and not to the engine 2, the vehicle ECU 22 disengages the clutch 4 and instructs the inverter ECU 26 to set the output torque of the electric motor 6 to the required torque.

In this case, since no torque is assigned to the engine 2, the engine ECU 24 controls the engine 2 to idle. Meanwhile, the inverter ECU 26 controls the inverter 20 in accordance with the torque designated by the vehicle ECU 22, so that DC power of the battery 18 is converted into AC power by the inverter 20 and supplied to the electric motor 6. The electric motor 6 is thus supplied with the AC power, and the electric motor 6 is operated as a motor, thereby producing the required torque. The output torque of the electric motor 6 is transmitted to the driving wheels 16 through the transmission 8.

When the required torque is divided between the engine 2 and the electric motor 6, the vehicle ECU 22 engages the clutch 4. Further, the vehicle ECU 22 instructs the engine ECU 24 to set the output torque of the engine 2 to its corresponding divided torque, and also instructs the inverted ECU 26 to set the output torque of the electric motor 6 to its corresponding divided torque.

The engine ECU 24 controls the engine 2 to produce the divided torque designated by the vehicle ECU 22. the inverter ECU 26 controls the inverter 20 according to the divided torque designated by the vehicle ECU 22. Consequently, the required torque is produced as the sum of the output torque of the engine 2 and the torque of the electric motor 6, and transmitted to the driving wheels 16 through the transmission 8.

When the required torque is assigned only to the engine 2 and not to the electric motor 6, the vehicle ECU 22 engages the clutch 4. The vehicle ECU 22 further instructs the engine ECU 24 to set the output torque of the engine 2 to the required torque, and also instructs the inverter ECU 26 to set the output torque of the electric motor 6 to zero.

The engine ECU 24 controls the engine 2 to produce the required torque designated by the vehicle ECU 22. On the other hand, the inverter ECU 26 controls the inverter 20 so that the electric motor is operated neither as a motor nor as a generator. Consequently, the required torque outputted form the engine 2 is transmitted to the driving wheels 16 through the transmission 8.

Figure 2:
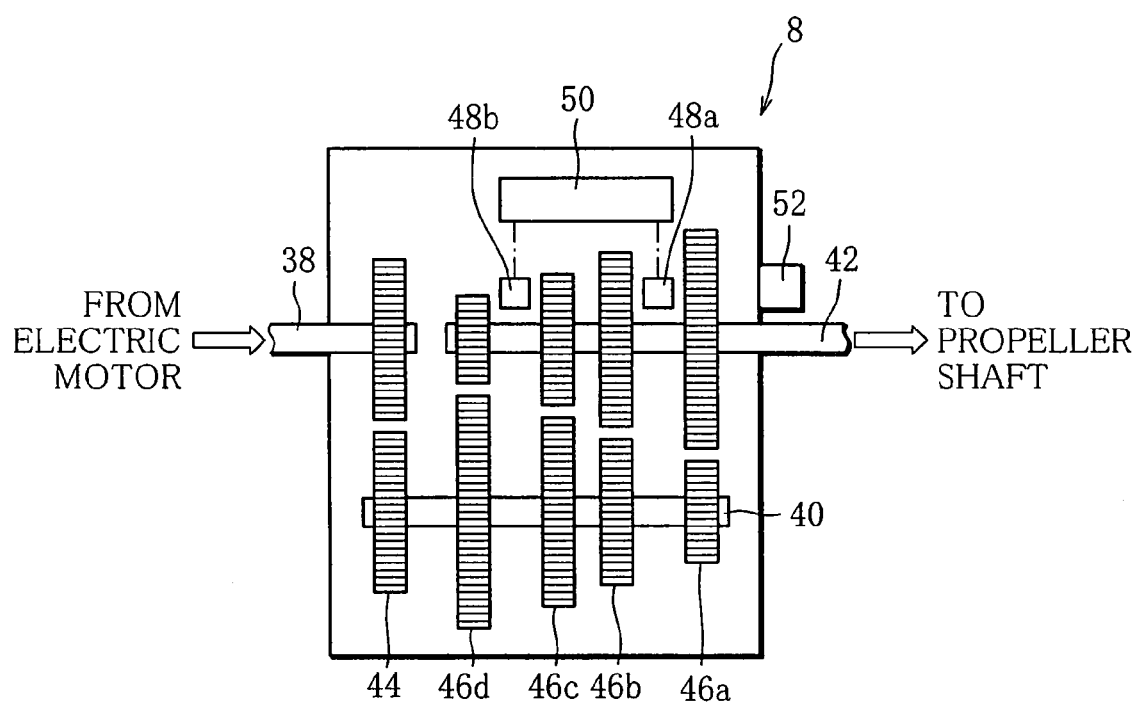
FIG. 2 is a diagram showing the schematic structure of a transmission used in the electric vehicle of FIG. 1.

FIG. 2 shows the schematic structure of the transmission 8. The transmission 8 comprises an input shaft 38 connected with the rotary shaft of the electric motor 6, a countershaft 40, and an output shaft connected with the propeller shaft 10.

An input gear 44 consisting of a pair of gear wheels is provided to ride on the input shaft 38 and the counter shaft 40 so that rotation is transmitted from the input shaft 38 to the countershaft 40. A plurality of speed change gears 46a, 46b, 46c, 46d, each consisting of a pair of gear wheels, are provided to ride on the countershaft 40 and the output shaft 42, where the paired gear wheels of each speed change gear always mesh with each other with a gear ratio for each speed stage. In each of the speed change gears 46a to 46d, the gear wheel on the output shaft 42 is rotatable relative to the output shaft 42, while the gear wheel on the countershaft 40 is fixed to the countershaft 40. The speed change gears 46a, 46b, 46c and 46d are for the first, second, third and fourth speed stages, respectively. Among these speed stages, the second speed stage is selected as a speed stage for start-up of the vehicle at a normal start-up of the vehicle (hereinafter, the speed stage for start-up of the vehicle is referred to as "vehicle start-up speed stage").

To the output shaft 42, synchronizing mechanisms 48a and 48b are provided to synchronize the rotation of the output shaft 42 and the rotation of each speed change gear. For the speed change gears 46a and 46b, the synchronizing mechanism 48a is used. For the speed change gears 46c and 46d, the synchronizing mechanism 48b is used. Since the structure of the synchronizing mechanisms 48a and 48b is well-known, the detailed description thereof will be omitted.

The transmission 8 also includes a speed change actuator 50 which causes the synchronizing mechanism 48a or 48b to operate to change the speed stage according to a control signal fed from the vehicle ECU 22. Thus, the synchronizing mechanisms 48a and 48b and the speed change actuator 50 constitute a shift mechanism of the present invention.

The transmission 8 further includes a transmission position sensor (speed stage detection means) 52 for detecting a speed stage in present use in the transmission 8, and feeding the detection result to the vehicle ECU 22. It is to be noted that the transmission position sensor also detects that the transmission 8 is in a neutral state where no speed stage is selected.

In the hybrid electric vehicle 1 arranged as described above, when the vehicle is caused to start traveling, the following controls are performed chiefly by vehicle ECU 22.

First, suppose that the vehicle is at rest with the engine 2 stopped. When the driver operates a starting switch (not shown) to start the engine 2, with a change lever 54 for operating the transmission 8 in neutral position, the vehicle ECU 22 confirms, on the basis of a detection output from the transmission position sensor 52, that the transmission 8 is in neutral state so that the electric motor 6 and the driving wheels 16 are mechanically disconnected. The vehicle ECU 22 further confirms that the clutch 4 is engaged, on the basis of a detection output from a clutch position sensor (not shown). After these confirmation, the vehicle ECU 22 feeds to the inverter ECU 26 an instruction designating an output torque of the electric motor 6 required for starting the engine 2, and instructs the engine ECU 24 to operate the engine 2.

On the instruction from the vehicle ECU 22, the inverter ECU 26 operate the electric motor 6 as a motor to produce a torque, thereby cranking the engine 2. At this time, the engine ECU 24 starts fuel supply to the engine 2, so that the engine 2 starts and idles.

After the engine 2 is started in the above-described manner, when the driver puts the change lever 24 in a traveling position such as drive position, the vehicle ECU 22 carries out a vehicle start-up shift control for shifting the transmission 8 from the neutral state to a start-up speed stage selected state in which a speed stage for start-up of the vehicle has been selected.

Figure 3:
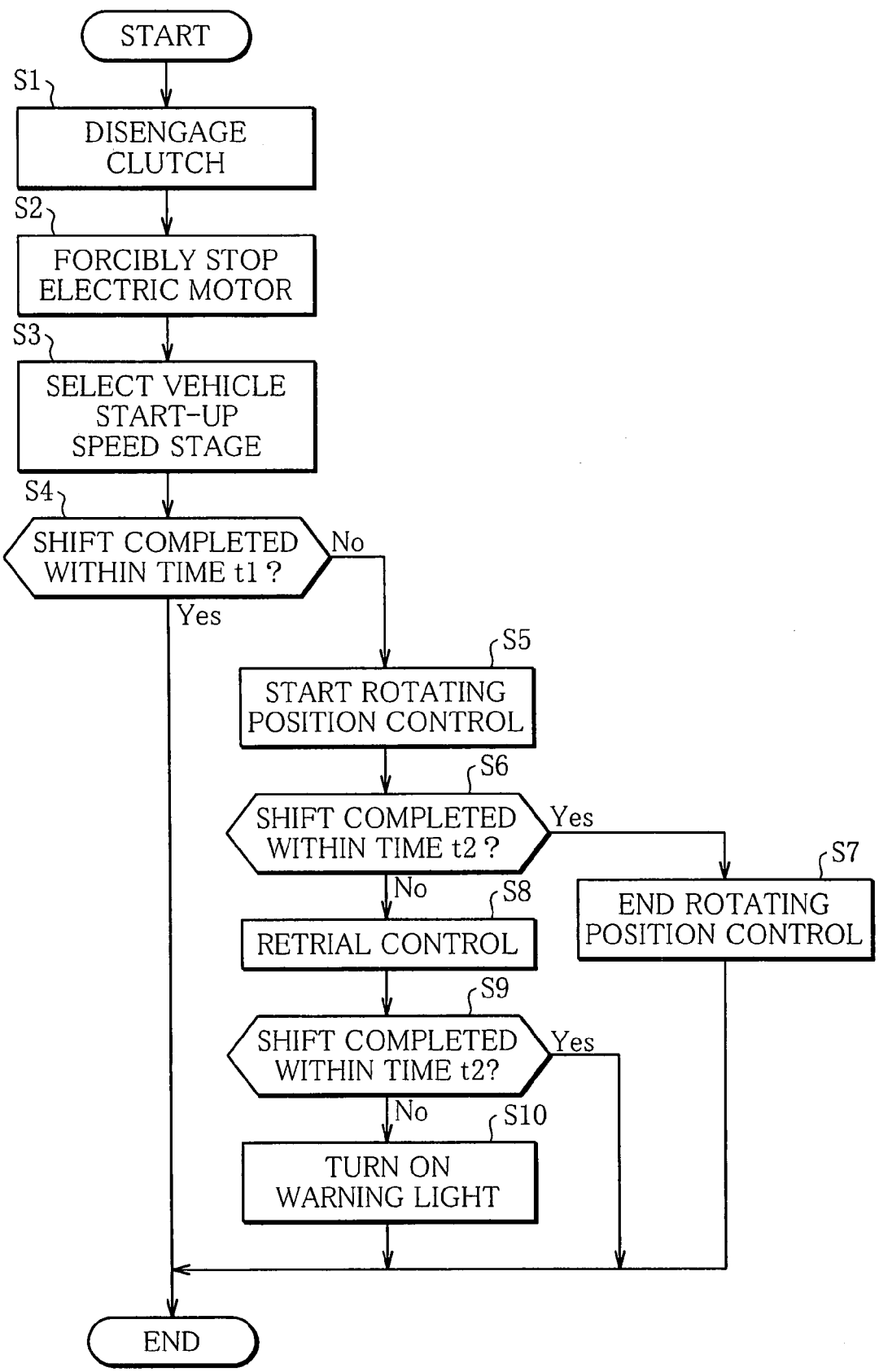
FIG. 3 is a flow chart of a vehicle start-up shift control, performed in the electric vehicle of FIG. 1.

This vehicle star-up shift control is performed according to a flow chart of FIG. 3, and started when the driver puts the change lever 54 in a traveling position such as drive position.

When the vehicle start-up shift control is started, first the vehicle ECU 22 disengages the clutch 4 in Step S1. Since the clutch 4 is engaged when the engine 2 is started by the electric motor 6, the electric motor 6 rotates with the engine 2 which idles. When the transmission 8 is to be shifted from the neutral state to the start-up speed stage selected state, it is desirable to stop the rotation of the input shaft 38 and countershaft 40 of the transmission 8 to reduce a load on the synchronizing mechanism 48a. For this reason, the vehicle ECU 22 disengages the clutch 4.

Although the transmission of a driving force from the engine 2 to the electric motor 6 is interrupted by disengaging the clutch 4, the electric motor 6 continues rotating by inertia. Thus, next in Step S2, the vehicle ECU 22 instructs the inverter ECU 26 to forcibly stop the electric motor 6 by causing the electric motor 6 to produce a regenerative braking force. Receiving this instruction, the inverter ECU 26 causes the electric motor 6 to produce a regenerative braking force, thereby stopping the rotary shaft of the electric motor 6 forcibly. Consequently, both the input shaft 38 and the output shaft 42 of the transmission 8 come to rest, which facilitates a shift to select the vehicle start-up speed stage performed by the synchronizing mechanism 48a after this.

Next in Step S3, the vehicle ECU 22 sends a control signal to the speed change actuator 50 of the transmission 8 which is now in the neutral state, to perform a shift to select the vehicle start-up speed stage, i.e., the second speed stage.

Figure 4:
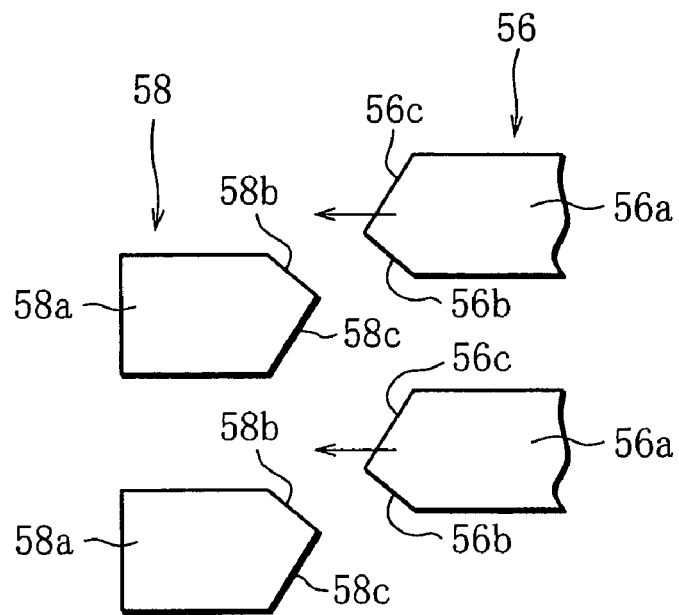
FIG. 4 is a diagram showing schematic arrangement of splines of a spline gear and dog teeth of a clutch gear in the transmission of FIG. 2.

As shown in FIG. 4, a spline gear 56 of the synchronizing mechanism 48a has splines 56a each formed with a chamfered surface 56b having an acute angle with respect to the elongation axis of the spline 56a and a chamfered surface 56c having an obtuse angle with respect to the elongation axis of the spline 56a. Meanwhile, a clutch gear 58 provided to the speed change gear 46b has dog teeth 58a each formed with a chamfered surface 58b having an acute angle with respect to the elongation axis of the dog tooth 58a and a chamfered surface 58c having an obtuse angle with respect to the elongation axis of the dog tooth 58a.

With the provision of such asymmetrical chamfered surfaces, when the spline gear 56 is rotating at a higher speed than the clutch gear 58, and therefore, in FIG. 4, the spline gear 56 moves downward relative to the clutch gear 58, the splines 56a fit between the dog teeth 58b with an increased ease.

Receiving the control signal from the vehicle ECU 22, the speed change actuator 50 causes the synchronizing mechanism 48a to operate to move the spline gear 56 in the direction of the arrows in FIG. 4, namely toward the speed change gear 46b so that the splines 56a of the spline gear 56 will fit between the dog teeth 58b of the clutch gear 58.

In Step S4, the vehicle ECU 22 determines, based on a detection result fed from the transmission position sensor 52, whether or not the transmission 8 has been shifted from the neutral state to the start-up speed stage selected state, i.e., the state in which the second speed stage has been selected, by the procedure in Step S3. If it is determined that the shift to the start-up speed stage selected state has been completed within a first specified time t1 (several 10 ms to several 100 ms, for example), the vehicle ECU 22 ends the present cycle of the vehicle start-up shift control.

If the shift from the neutral state to the start-up speed stage selected state is not completed after the elapse of the first specified time t1, the vehicle ECU 22 performs a rotating position control in Step S5.

Figure 5:
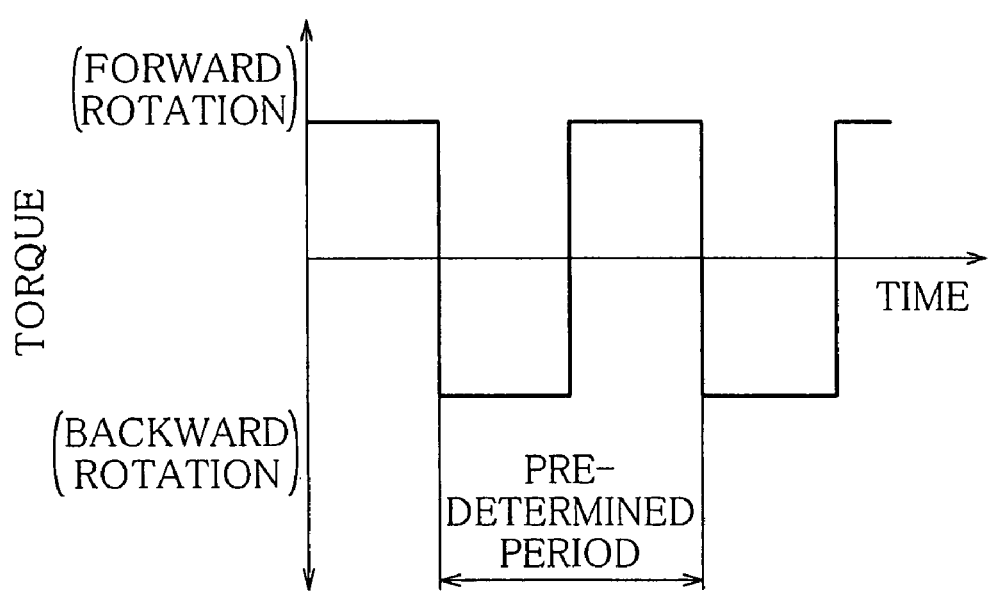
FIG. 5 is a time chart showing torque produced by an electric motor under a rotating position control in the shift control shown in FIG. 3.

Specifically, receiving the result of determination in Step S4, the vehicle ECU 22 instructs the inverter ECU 26 to control the electric motor 6 to produce a predetermined minute torque (several tenths N·m, for example) in the forward and backward rotation directions, alternately, with a predetermined period (100 ms to 200 ms, for example), as shown in FIG. 5.

Receiving this instruction, the inverter ECU 26 controls the electric motor 6 to produce the predetermined minute torque in the forward and backward rotation directions, alternately, with the predetermined period.

The minute torque outputted from the electric motor 6 is transmitted to the input shaft 38 of the transmission 8 connected with the rotary shaft of the electric motor 6, so that the input shaft 38 oscillates in the rotation direction with the predetermined period. The oscillation is transmitted to the speed change gear 46b through the countershaft 40, so that the gear wheel of the speed change gear 46b on the output shaft 42 oscillates and thereby the positional relation between the splines 56a of the spline gear 56 and the dog teeth 58a of the clutch gear 58 varies. Consequently, the splines 56a and the dog teeth 58a are released from butting and the splines 56a fit in the clutch gear 58, so that the shift to the start-up speed stage selected state is completed.

The magnitude and period of the minute torque produced by the electric motor 6 under the rotating position control is set to the level which does not make the driver feel uncomfortable.

In Step S6, the vehicle ECU 22 determines, based on a detection result fed from the transmission position sensor 52, whether or not the transmission 8 has been shifted from the neutral state to the start-up speed stage selected state, i.e., the state in which the second speed stage has been selected by virtue of the rotating position control executed in Step S5. If it is determined that the shift to the start-up speed stage selected state has been completed within a second specified time t2 (2 seconds, for example), the vehicle ECU 22 ends the rotating position control in Step S7, and ends the present cycle of the vehicle start-up shift control.

If the splines 56a and the dog teeth 58a are not released from butting even by the rotating position control so that the shift from the neutral state to the start-up speed stage selected state is not completed after the elapse of the second specified time t2, the vehicle ECU 22 carries out, in Step S8, a retrial control in place of the rotating position control.

Specifically, in the retrial control, receiving the result of determination in Step S6, the vehicle ECU 22 once stops the shift to the start-up speed stage selected state, i.e., the state in which the second speed stage has been selected, and carries out a shift to a state in which a speed stage other than the vehicle start-up speed stage has been selected, for example the third speed stage.

The positional relation between the spline gear 56 and the clutch gear 58 is not necessarily the same for the different speed stages. Thus, even when the shift to the start-up speed stage selected state cannot be accomplished, the shift to the state in which a speed stage other than the vehicle start-up speed stage has been selected can be accomplished. When the speed stage other than the vehicle start-up speed stage is once selected like this, the splines 56 of the spline gear 56 for the selected speed stage other than the vehicle start-up speed stage push away and fit between the dog teeth 58a of the clutch gear 58 for the selected speed stage, which causes the countershaft 40 to slightly rotate. This varies the positional relation between the spline gear 56 and the clutch gear 58 for the vehicle start-up speed stage, thereby allowing the splines 56 of the spline gear 56 for the vehicle start-up speed stage to fit in the clutch gear 58 for the vehicle start-up speed stage.

In Step S9, the vehicle ECU 22 determines, based on a detection result fed from the transmission position sensor 52, whether or not the transmission 8 has been shifted from the neutral state to the start-up speed stage selected state, i.e., the state in which the second speed stage has been selected by virtue of the retrial control executed in Step S8. If the shift to the start-up speed stage selected state has been completed within the second specified time t2, the vehicle ECU 22 ends this cycle of vehicle start-up shift control.

If the shift from the neutral state to the start-up speed stage selected state, i.e., the state in which the second speed stage has been selected is not completed after the elapse of the second specified time t2, there is a possibility that the shift to the start-up speed stage selected state is not accomplished due to malfunction of the synchronizing mechanism 48a, the speed change actuator 50 or the like. Thus, in step S10, the vehicle ECU 22 turn on a warning light 60 provided on an instrument panel (not shown) and displays a warning to the effect that the shift from the neutral position to the start-up speed stage selected state cannot be accomplished.

In the above-described vehicle start-up shift control performed by the vehicle ECU 22, if the shift from the neutral position to the vehicle start-up speed stage selected state, i.e., the state in which the second speed stage has been selected is not completed within the first specified time, the electric motor 6 is caused to produce a minute torque in the forward and backward rotation directions, alternately, and by transmitting the minute torque to the input shaft 38 of the transmission 8, the speed change gear 46*b* for the vehicle start-up speed stage is caused to oscillate in the rotation direction. Thus, when the vehicle start-up speed stage cannot be selected due to reasons such that the splines 56*a* of the spline gear 56 of the synchronizing mechanism 48*a* butt against the dog teeth 58*a* of the clutch gear 58, the positional relation between the spline gear 56 of the synchronizing mechanism 48*a* and the clutch gear 58 of the speed change gear 46*b* is varied to allow the selection of the vehicle start-up speed stage. This enables a quick accomplishment of the shift to the start-up speed stage selected state.

In particular, in the rotating position control, instead of causing the electric motor 6 to rotate, the rotary shaft of the electric motor 6 is caused to oscillate in the rotation direction. Thus, the shift to the start-up speed stage selected state is not performed with the electric motor 6 rotating. This enables a quick and smooth shift to the start-up speed stage selected state.

If the shift to the start-up speed stage selected state is not completed within the second specified time even by performing the above-described rotating position control, the vehicle ECU 22 once select a speed stage other than the vehicle start-up speed stage. By this, the positional relation between the spline gear 56 of the synchronizing mechanism 48*a* and the clutch gear 58 of the speed change gear 46*b* for the vehicle start-up speed stage is varied, so that when the vehicle ECU 22 attempts the shift to the start-up speed stage selected state again, the selection of the vehicle start-up peed stage can be accomplished.

Further, in the present embodiment, the splines 56*a* of the spline gear 56 and the dog teeth 58*a* of the clutch gear 22 are each provided with asymmetrical chamfered surfaces as shown in FIG. 4. With the provision of such chamfered surfaces, when, in FIG. 4, the spline gear 56 moves downward relative to the clutch gear 58, the splines 56*a* fit between the dog teeth 58*a* with an increased ease.

With such splines 56 and dog teeth 58*a* provided, if the electric motor 6 is at rest with the obtuse-angled chamfered surfaces 56*c* facing the obtuse-angled chamfered surfaces 58*c*, respectively, there is an increased possibility that the splines 56*a* will butt against the dog teeth 58*a* and will not be able to fit between the dog teeth 58*a*. Further, if, by the forcible stopping in Step S2 of the vehicle start-up shift control, the electric motor 6 is not stopped completely but rotates in the backward direction, there is an increased difficulty in the splines 56*a* fitting between the dog teeth 58*a*.

Even in such cases, however, the present invention is especially effective, since the rotating control performed by the vehicle ECU 22 facilitates the splines 56*a* fitting between the dog teeth 58*a*.

In the present embodiment, the electric motor 6 is a permanent-magnetic synchronous electric motor, where the position of the rotary shaft of the electric motor 6 stopped is ruled by the permanent magnet so that the rotary shaft of the electric motor stopped is not easily moved by an external force. Thus, there is an increased difficulty in the splines 56*a* of the spline gear 56 pushing away and fitting between the dog teeth 58*a* of the clutch gear 58.

Even when such electric motor 6 is used, however, the present invention is especially effective, since performing the above-described rotating position control facilitates the splines 56*a* fitting between the dog teeth 58*a*, as mentioned above.

After the shift to the start-up speed stage selected state, i.e., the state in which the second speed stage has been selected is completed in this manner by the vehicle start-up shift control, when the driver steps on an accelerator pedal 30, the vehicle ECU 22 sets a required torque required to be transmitted to the transmission 8 for causing the vehicle to start traveling, in accordance with the depression amount of the accelerator pedal 30 detected by the accelerator opening sensor 32. Then, as mentioned above, the vehicle ECU 22 divides the required torque between the engine 2 and the electric motor 6, on the basis of information from each ECU, depending on the present operating state of the vehicle and the present operating state of the engine 2 and of the electric motor 6, and feeds an instruction designating a torque to the engine ECU 24 and the inverter ECU 26. In this process, the vehicle ECU 22 controls the transmission 8 and the clutch 4 as necessary.

In the above, an embodiment of the control device for the hybrid electric vehicle according to the present invention has been described. The present invention is, however, not limited to the described embodiment.

For example, in the described embodiment, the present invention is applied to a hybrid electric vehicle. Similar effects can, however, be obtained by applying a similar vehicle start-up shift control to an electric vehicle provided with only an electric motor as a driving source.

Further, the magnitude and period of the minute torque specified in the description of the rotating position control in the embodiment are given only by way of example. The magnitude and period of the minute torque are not limited to those mentioned but can be appropriately modified depending on the specifications of the vehicle, the motor 6, the transmission 8 or the like.

In the described embodiment, the vehicle start-up shift control is carried out to select the forward second speed stage intended as the vehicle start-up speed stage. A similar vehicle start-up shift control can, however, be carried out when the driver puts the shift lever 54 in reverse position so that the speed stage for reverse traveling is selected as the vehicle start-up speed stage.

In the described embodiment, the speed stage other than the second speed stage that is the vehicle start-up speed stage is selected in the retrial control performed in the vehicle start-up shift control. Such speed stage other than the vehicle start-up speed stage is, however, not limited to the third speed stage but can be any speed stage other than the vehicle start-up speed stage.

In the described embodiment, the splines 56*a* of the spline gear 56 and the dog teeth 58 of the clutch gear 58 are each provided with asymmetrical chamfered surfaces. The splines and the dog teeth may, however, be provided with symmetrical chamfered surfaces.

Further, the length of the first specified time as well as the length of the second specified time mentioned in the description of the vehicle start-up shift control in the embodiment is given only by way of example and can be modified appropriately. For example, the first specified time and the second specified time can be the same length. Further, for example, the second specified time in Step S6 after the rotating position control can differ from the second specified time in Step S9 after the retrial control.

In the described embodiment, the electric motor 6 is a permanent-magnetic synchronous motor. The type of the electric motor is, however, not limited to this.

In the described embodiment, the transmission 8 is a transmission having four speed stages, namely the first to fourth speed stages, among which the second speed stage is intended as the vehicle start-up speed stage. The number of speed stages and the speed stage intended as the vehicle start-up speed stage are not limited to this, but can be modified appropriately.

In the described embodiment, in each of the speed change gears 46a to 46d of the transmission 8, the gear wheel on the output shaft 42 is rotatable relative to the output shaft 42, while the gear wheel on the countershaft 40 is fixed to the countershaft 40. The arrangement of the rotatable gear wheels and the fixed gear wheels is not limited to this. With the arrangement appropriately modified depending the specifications of the transmission 8, similar effects can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control device for an electric vehicle arranged such that a driving force of an electric motor can be transmitted to driving wheels of the vehicle through a transmission capable of being shifted, by means of a shift mechanism, from a neutral state to a start-up speed stage selected state in which a speed stage for start-up of the vehicle has been selected, comprising:

a speed stage detection means for detecting speed stage selected in the transmission; and a control means which, on a request for a shift from the neutral state to the start-up speed stage selected state, performs a shift from the neutral state to the start-up speed stage selected state by controlling the shift mechanism, and if it is judged based on a detection result fed by the speed stage detection means that the shift to the start-up speed stage selected state is not completed within a first specified time, the control means performs a rotating position control in which the electric motor is controlled to produce a predetermined minute torque in forward and backward rotation directions of the electric motor, alternately, and a speed change gear of the speed stage for start-up of the vehicle is caused to oscillate in a rotation direction by the minute torque being transmitted to an input shaft of the transmission.

2. The control device for an electric vehicle according to claim 1, wherein if the shift to the start-up speed stage selected state is not completed within a second specified time after the rotating position control is started, the control means controls the shift mechanism to once select a speed stage other than the speed stage for start-up of the vehicle and then perform a shift to the start-up speed stage selected state again.

3. The control device for an electric vehicle according to claim 1, wherein the shift mechanism includes a synchronizing mechanism having asymmetrical chamfered surfaces.

4. The control device for an electric vehicle according to claim 1, wherein the electric motor is a permanent-magnetic synchronous motor.

* * * * *